United States Patent [19]

Arrau

[11] Patent Number: 5,534,437
[45] Date of Patent: Jul. 9, 1996

[54] CO-COMPOSTING PROCESS AND APPARATUS FOR TREATING SOLID WASTE AND SEWAGE SLUDGE

[75] Inventor: Agustin H. Arrau, Mill Neck, N.Y.

[73] Assignee: Bio-Waste Technologies, International, Ltd., Kingston, Br. Indian Ocean Ter.

[21] Appl. No.: 409,542

[22] Filed: Mar. 24, 1995

Related U.S. Application Data

[63] Continuation of Ser. No. 251,515, Jun. 6, 1994, abandoned, which is a continuation of Ser. No. 77,238, Jun. 14, 1993, abandoned.

[51] Int. Cl.⁶ .................................. C12M 1/10; B01J 8/08
[52] U.S. Cl. ............................ 435/290.3; 71/9; 422/209
[58] Field of Search ................................ 422/184, 209, 422/210; 435/289.1, 290.1, 290.3; 71/9

[56] References Cited

U.S. PATENT DOCUMENTS

| | | | |
|---|---|---|---|
| 2,954,284 | 9/1960 | Carlsson et al. | 71/9 |
| 3,138,447 | 6/1964 | Eweson | 71/9 |
| 3,178,267 | 4/1965 | Larson | 422/109 |
| 3,235,369 | 2/1966 | Eweson | 71/9 |
| 3,245,759 | 4/1966 | Eweson | 422/210 |
| 3,676,074 | 7/1972 | Shibayama et al. | 422/209 |
| 4,255,389 | 3/1981 | Jung et al. | 422/209 |
| 4,272,489 | 6/1981 | Lutz et al. | 422/209 |
| 4,499,614 | 2/1985 | Yeagley | 4/111.1 |
| 5,071,462 | 12/1991 | Kimura | 71/7 |
| 5,139,554 | 8/1992 | Johnson | 71/9 |
| 5,244,804 | 9/1993 | Horkan et al. | 422/184 X |
| 5,300,438 | 4/1994 | Augspurger et al. | 422/184 X |

FOREIGN PATENT DOCUMENTS

| | | |
|---|---|---|
| 3920539 | 11/1990 | Germany. |
| 4021867A1 | 11/1991 | Germany. |
| 5392263 | 8/1978 | Japan. |
| 60-11290 | 1/1985 | Japan. |

*Primary Examiner*—Ferris Lander
*Attorney, Agent, or Firm*—Wolf, Greenfield & Sacks

[57] ABSTRACT

A method for converting municipal solid waste and sewage sludge into an organic fertilizer has a Stage 1 and a Stage 2, and includes a vessel that has three climate zones. Stage 1 has three climate zones, wherein the first climate zone contains thermophilic microorganisms, the second climate zone contains mesophilic microorganisms, and the third climate zone contains other microorganisms. The product of Stage 1 is reintroduced into Stage 2 and is then inoculated with a biodegrading enzyme and a bacteria species to produce a different final product fertilizer from Stage 2.

7 Claims, 6 Drawing Sheets

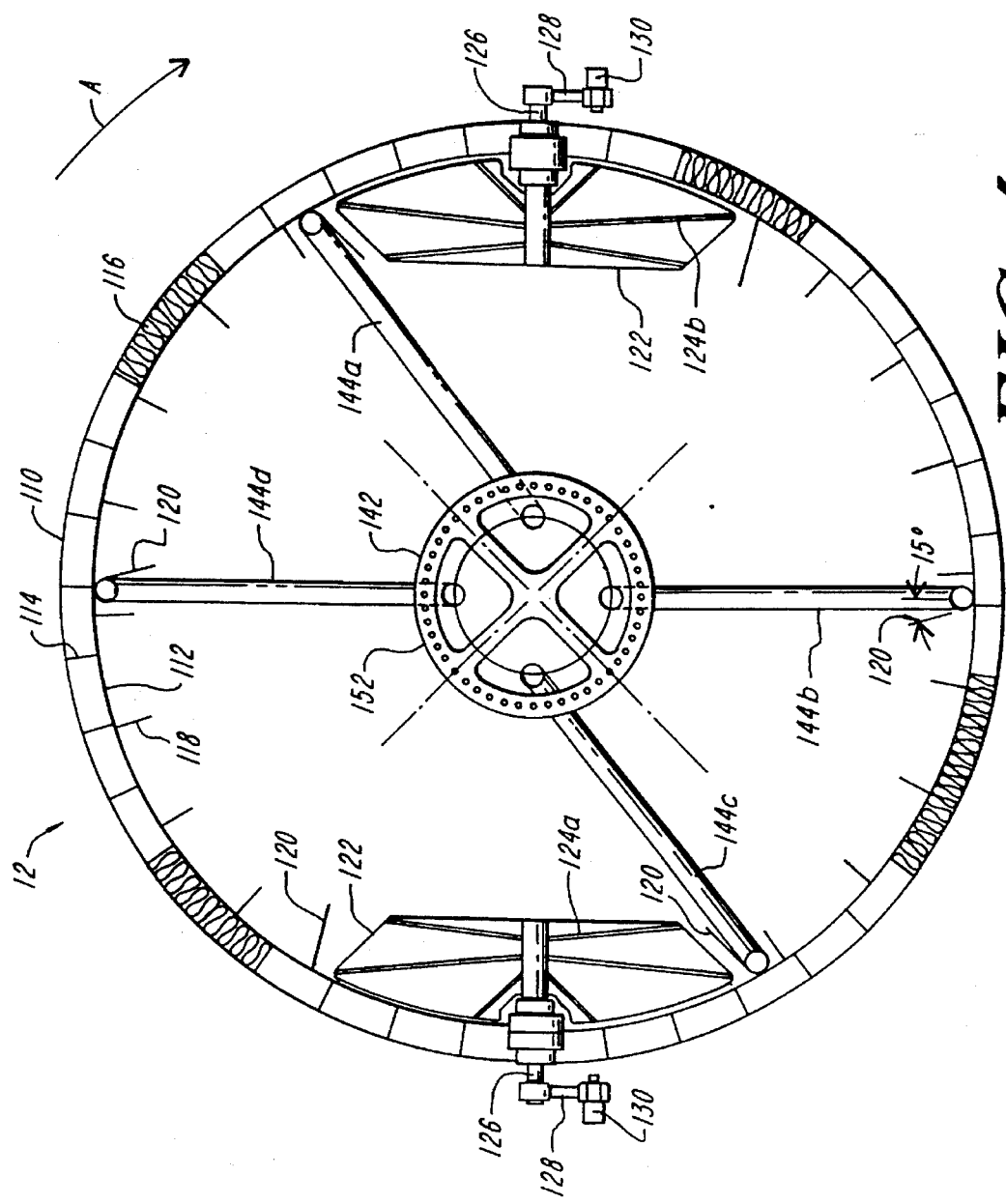
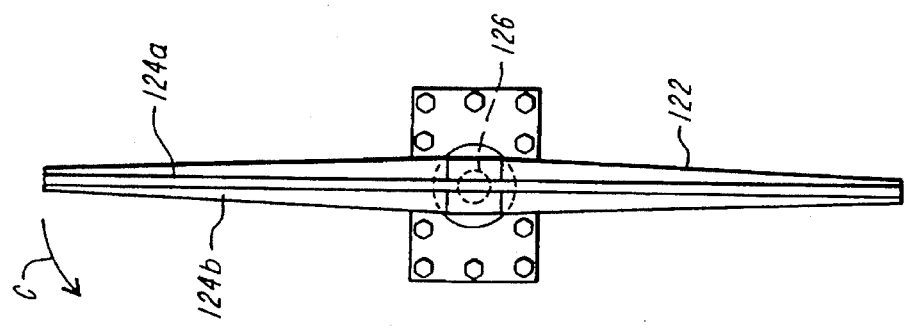

CO-COMPOSTING PROCESS AND APPARATUS FOR TREATING SOLID WASTE AND SEWAGE SLUDGE

This application is a continuation, of application Ser. No. 08/251,515, filed Jun. 6, 1994 and now abandoned, which is a continuation of application Ser. No. 08/077,238, filed Jun. 14, 1993 and now abandoned.

BACKGROUND OF THE INVENTION

1. Field of the Invention

The present invention relates to the treatment of municipal solid waste (MSW) and sludge by microorganisms.

2. The Prior Art

Governmental efforts have failed to solve the growing problem of sewage sludge pollution which is becoming a serious threat to our already endangered soil resources. This has resulted from strong government promotion of large-scale land disposal of 15 to 40 tons per acre of inadequately modified sewage sludge.

The harmful effects of this practice on soil structure, such as allowing toxic metal accumulations and leachate into the underlying water table, should be obvious. It is, in fact, as if the most basic of agricultural practices, proven over thousands of years, were being completely ignored.

One thousand years ago the fertilizing practices of the preceding 3,000 years were described in a manuscript by El Doctor Excellente Abu Zacharia Iahia of Seville, Spain. It was translated from Arabic into Spanish by order of King Carlos IV and published in 1802 as El Libro de Agricultura, followed by a French edition in 1864. Though not yet available in English, it has often been referred to and quoted for its undisputedly sound principles by English writers on agriculture.

The book describes the highly developed agricultures in China, India and Persia at about 1,000 year intervals. The last such development came some 1,000 years later during the Arab rule of Spain, when natural agriculture and horticulture no doubt reached its highest development ever with respect to yields, varieties, and quality of produce.

Of particular interest here is, of course, what Abu Zacharia, who was also the owner and operator of a large farm, writes on the composition, preparation and use of manures, the basic source for all fertilizers. Until recent times, the human variety of manure was the preferred source. By his own experience, confirmed by that of other farmers over thousands of years, he could stress in the strongest terms that manures should never be applied to the land alone or while fresh, but always be mixed with five to ten times as much plant waste, preferably including some animal bedding for its valuable urine.

This would not only provide a better balanced and more effective fertilizer, especially if left in a pile for a month or two for "mellowing," but also many times more of it. Much better still would be subjecting the mixture to composting, which he describes in great detail, including what the finished product should look like and how best to use it.

Just why manures should not be used alone was, of course, not known then. Today we know the reason very well, although it is still widely ignored, namely, that organic carbon is the basic nutrient for all forms of life, being about 50% of all living tissue. Food for man, beast and all other forms of life is therefore also about 50% carbon, of which most is utilized, and only a very small portion remains in the excrements after the digestive process. To what extent any such remaining carbon is affected by that process so as to be of little or no value for recycling to the soil to sustain its all-important microbial activities, which includes the natural soil process of composting, remains in controversy. But the obvious conclusion from what is known and factual is that applying manures or sewage sludge alone to the land will not improve it.

This will inevitably lead to more of the same kind of carbon deficiency or soil impoverishment that chemical fertilizers are creating in our times, which are commonly described as being poor in humus or organic matter, which is 50% carbon.

In their belated attempts to find a way to reduce the rapidly worsening sludge disposal problem, federal and state governments have in recent years funded large and costly plants for composting sewage sludge, thereby hoping to make it less objectionable for land and dump site disposal. The technology entails mixing the partly dehydrated sludge with about three times the volume of wood chips as a bulking agent. The mixture is then composted in large open piles during four to five weeks followed by curing in other piles for another three weeks. The resulting compost is then screened in order to recover as much as possible of the very hard-to-degrade wood chips for reuse as bulking agent with another batch of sludge.

The resulting product is therefore as deficient in carbon as is the sludge. It is certainly not compost. Because there has not been enough carbon for the necessary microbial activities, this final material is essentially sewage sludge as to consistency and structure with high leachability into the underlying water table. Worse, it still has the same high content of highly toxic metals as the original sludge.

Another serious and environmental problem from such alleged "composting" is the polluting leachate and the foul air from the piles. This is aggravated as compressed fresh air is forced through the piles, because such air is toxic to the microbes and stops their activities until aeration ceases, causing condensation of the moisture to lodge on the surface or bottom of the pile, depending upon air being drawn out of the pile or blown into it.

The reason for the carbon deficiency is that wood chips, like all wood, contain a great deal of lignin, nature's own very efficient preservative which gives wood its high resistance to decay.

The high temperatures developed by the microbial activities in an efficient composting process, which is more than adequate to destroy all the pathogens which abound in sewage sludge, can obviously not be attained by the above method. Minimum temperature requirements were established by the federal EPA about 20 years ago much along the lines already established in European countries. They are brief in that sludge and garbage pathogens are destroyed by composting within 20 to 30 minutes at temperatures of 140° to 160° F. To accommodate its method, EPA's temperature requirements have had to be lowered to 131° F., and the time extended to a full three days. No efficient industrial-type composting method can meet such requirements except by doubling or tripling the processing time, although it will much more than meet the original higher requirements for pathogen destruction.

The absurdity of the situation is spotlighted by the fact that the method for which the new EPA rules were tailored cannot actually meet them. While the modest temperature of 131° F. can be attained, it cannot remain more than a few hours, or until the pile has to be aerated, which happens six to eight times every 24 hours with compressed air through a complicated system of perforated pipes. This, of course, brings down the temperature in the pile to near ambient levels, putting a full stop to the microbial activities, from which it will take a few hours to recover. Actual exposure to 131° F. is therefore unlikely to be more than half of the stipulated three days. Beside that, the temperatures can never be uniform in stationary piles, and never much over ambient on their surface, with good chances for any pathogens to survive.

The first large government composting operation for sewage sludge was located at Beltsville, Md. Generously funded by various government authorities, operations began in the early 1970s and continued until 1978. In 1974, it was announced that a successful windrow method utilizing wood chips as bulking and moisture-absorbing agent had been developed. Upon inspecting the operations, there was strong evidence of bad odor and leachate problems. A fully enclosed composting method might solve these problems, but most of the wood chips would break down and be composted, and therefore not used again. That would not do at all, as it would be too expensive.

Despite the setbacks by several closed down operations, promotion of the EPA method continues unabated, now also by states and universities inspired by EPA's official evaluation of its own contribution, which reads as follows: The new Beltsville composting process represents a major advance over previously known composting methods.

Several other attempts have been made in the past to solve these prior art problems, and prior proposals include the following.

Eweson U.S. Pat. No. 3,138,447 discloses a multistage process for producing organic fertilizer.

Larson U.S. Pat. No. 3,178,267 discloses an automatic control of a digester for converting inorganic material into plant food.

Eweson U.S. Pat. No. 3,235,369 discloses a fermented fertilizer having a granular structure.

Eweson U.S. Pat. No. 3,245,759 discloses an apparatus for making organic fertilizer.

Yeagley U.S. Pat. No. 4,499,614 discloses an organic waste bioconverter.

Kimura U.S. Pat. No. 5,071,462 discloses producing organic fertilizer with the use of nitrogen fixing bacillus.

Johnson U.S. Pat. No. 5,139,554 discloses a composting method using inclined vessel.

SUMMARY OF THE INVENTION

It is not only that co-composting carbon-rich garbage together with nitrogen-rich sludge, having from 6% to 25% nitrogen by weight, according to the present invention, makes for efficient processing with a very high grade of compost and make possible nonpolluting disposal and utilization of both sludge and garbage at greatly reduced cost, it also solves the problem of the highly toxic metals in the sludge. This is for the simple reason that a town generates from 15 to 20 times more garbage than sewage sludge on dry basis. As the former contains little or no toxic metals, co-composting cause a corresponding dilution of those metals in the sludge, bringing them down far below the levels that have officially been ruled as acceptable or harmless. There can obviously be no such reduction in the toxic metals by the prior art method of composting sludge with wood chips. On the contrary, as some sewage solids are converted into heat energy during composting, the proportion of toxic metals will actually increase.

In the past 10 years, dramatic new developments in mankind's ability to select and manipulate genetic material has sparked unprecedented interest in the industrial uses of living organisms. Researchers the world over now recognize the need in a wide diversity of industrial sectors for the cellular machinery that can turn what were only dimly envisioned potentials into actualities that function reliably. When implemented, these cellular processes will facilitate the production of new foods and drugs, as well as an array of improved agricultural processes. Most importantly, they provide techniques for the biodegradation of the solid wastes that imperil the entire planet.

Starting with Aristotle's De Anima, written in the fourth century B.C., and with dazzling sophistication since Watson and Crick mapped the recombinant DNA molecule in the middle of this century, biological processes have made life less nasty, brutish and short for most of us. They have now put the control of genetic material within our power. We can now choose the genes used by cells to control the production of molecules. And we can now devise the enzymes that will bring about astonishing changes, among them those multiple substrate conversions required for biological waste treatment.

The biological process known as co-composting that will transform MSW, along with sewage sludge and probably as many as 250 types of organic matter, is controlled by enzymes. In its catalyst role for the biodegradation of all macromolecules in whatever it contacts, this enzyme will first sort the most diverse chemical mixes into their separate basic elements, no one of them toxic, but each an accessory agent in a tightly controlled process of aerobic fermentation. Whatever MSW and sludge the enzyme contacts will undergo its transforming fermentation in sealed 300-ton capacity steel vessels from which neither odors nor pollutants can emerge. What will emerge instead after a short fermentation period will be a contaminant-free, nutrient-rich, agriculturally replenishing compost that not only meets, but exceeds, all EPA Type 1 standards.

The above deficiencies in the prior art are overcome by a method of making organic fertilizer from solid waste and sewage sludge throughout an entire vessel in a two stage process. The entire vessel functions as a multiple sequence of zones. The treated material in each of the zones serves as starting material for entering the next zone, which comprises the following steps. In the first stage throughout the entire vessel at least three successive zones are established for the treatment of the material by thermophilic groups of aerobic microorganisms in the first zone; mesophilic groups of aerobic microorganisms in the second zone; and another aerobic microorganism combination of actinomycetes, protozoa and fungi in the third zone. The climate, including temperature, moisture content and $CO_2$ content in the respective zones, is controlled to be conducive to the optimum development of the thermophilic microorganisms, the mesophilic microorganisms, and the microorganism combination. The material in each of said controlled climate zones is treated to propagate the thermophilic microorganisms, the mesophilic microorganisms and the microorganism combination in the respective zones climatically for the optimum development thereof. After biodigestion in the entire vessel as a first zone, all of the material treated in the first zone of the entire vessel is caused to be biodigested in the next following zone of the entire vessel in the sequence recited by substantially changing the climatic conditions of the entire vessel during a transition from one zone to the next zone.

The thoroughly inoculated portion of the material is transitioned into each zone with the sewage sludge in each such zone. The controlled climatic conditions of each of such zone are substantially controlled during treatment of the material by the respective group of microorganisms therein. An organic fertilizer is then recovered from the third zone.

The apparatus of the invention is directed to a digester for processing and converting solid waste and sewage sludge into an organic fertilizer and assimilable plant food. The apparatus consists of an elongated rotary vessel, means for rotating the vessel, feed means for introducing the material to be processed into a feeding end of the vessel, and means for discharging the processed material from a discharge end of the vessel. The material is agitated and propelled in the vessel from the feeding end to the discharge end. An air injector conduit enters the feeding end of the vessel, extending the full length of the vessel and exiting from the discharge end of the vessel. A plenum outside the vessel mixes water vapor and carbon dioxide with heated air to produce an air mixture. A fan in the injector conduit adjacent the plenum pumps the air mixture into an end of the vessel, drawing gases through the vessel. Air distributor means maintains the air mixture above the MSW and sewage sludge. There is also provided a temperature sensing element, a moisture sensing element and a carbon dioxide sensing element in the conduit downstream of the fan; and a temperature sensor, a moisture sensor, and a carbon dioxide sensor in the vessel. Computer control means receive input measurement signals from the temperature, moisture and carbon dioxide sensors, as well as the temperature, moisture and carbon dioxide sensing elements, and communicates with the plenum to adjust the temperature, humidity and carbon dioxide content of the air mixture so as to control the temperature, pressure, humidity and conditioned air flow in the digester, and to produce the organic fertilizer.

MSW is refuse generated by homeowners, businesses and industry collected regularly by towns and municipalities and discarded or processed by recycling, incineration, composting or landfilling. It is a very important component of the overall waste stream.

The typical composition of MSW is:

| | |
|---|---|
| Paper and carboard | 40% |
| Glass | 8% |
| Assorted metals | 6% |
| Yard and food waste | 17% |
| Plastic | 12% |
| Assorted fabrics | 3% |

The above percentages change with geographical area and the socio-economic conditions of the community. About 70% of the above waste is bio-degradable, Sewage sludge is treated or untreated raw sludge from cesspools, sewer systems and industrial waste such as food processing, dairy processing, having a nitrogen content ranging from 6% to 25% by weight.

In a preferred embodiment, this enzyme catalyzed reaction yields this ideal compost. The biodegrading of MSW is the process of foremost interest for two reasons: (1) at least 70% of what must be biodegraded in this country is MSW, and (2) it is MSW that poses the greatest danger of intolerable environmental (air, soil and water) pollution. But no less certainly, because of MSW's diverse chemical makeup, as its biodegradation proceeds, it forms an ideal substrate on which a resplendent array of altogether helpful microorganisms will not only thrive, but increase and multiply with avidity. Compounding geometrically as they go about their labors, these microorganisms transform the trash piles befouling cities into nutrients for urban gardens and parks, and for the suburban plots and farmlands that surround them. Directly or indirectly, municipalities using the process of the invention will, of course, be in full compliance with the recycling that is federally mandated.

The process of co-composting according to the present invention is the aerobic and thermophilic decomposition of organic wastes achieved by a mixed population of indigenous microorganisms at work under rigorous biological controls. When the co-composting is completed, all of the organic matter subjected to it is transmuted into a stable and unique agricultural product that is free of offending odors, pathogenic bacteria and phytotoxic infectants.

The co-composting process of the invention entails a continuous 3 to 5 day processing of MSW and sewage sludge in a series of inter-connected steel vessels that are sealed rotary fermenters. Every day each can accept approximately 250 metric tons of MSW that has not required prior shredding, sorting or pre-conditioning of any kind. The process will accept any provider's MSW directly from the vehicles that collect it.

In a preferred embodiment, the process has two stages. In its first stage, the MSW delivered into the steel vessels is mixed with raw sewage and subjected to continuous tumbling for from three to five days. Throughout the vessel the ingredients are exposed to 160° to 185° F. that destroys all pathogens contained therein. It is then transported by conveyor belts to a primary trommel screening device, and then moved on to a secondary screening device.

In the past, only universal ecological practices according to the laws of nature have been put to industrial uses. However, in the process of the present invention, these natural ecological practices have been greatly accelerated by superimposing on them benign biological stimulants that promote optimal microbial growth. Instead of being impositions that short-circuit the natural life cycle, they are impositions that now preserve and extend that cycle. For any depleted soil, the present invention makes possible the return of the natural ingredients that agriculture, misuse and neglect have taken from it. Advantageously, this return is not as toxic ashes from incinerators, nor as sewage sludge piped into our oceans, and not as poisonous landfills with their leachates.

After the first stage screenings have been completed in the process according to the invention, the treated MSW proceeds to the second stage. In the second stage, the treated material is inoculated with a pre-heated water-based colloidal suspension of a biodegrading enzyme that is described in Italian Patent No. 999,818 and in Spanish Patent No. 435, 460 previously used to compost static prior art mounds and prior art windrows of grains. (The disclosure of each of these patents is herewith incorporated by reference.) Transforming the static mounds of the prior art into usable compost required from 14 to 28 days, and throughout this time, the surrounding atmosphere was thickened with noxious odors and the water tables were invaded by leachates. There is no teaching or suggestion to use these biodegrading enzymes in a continuous process at far faster reaction rates in sealed reaction vessels according to the invention.

The elemental proportions of the enzyme are as follows:

| | |
|---|---|
| Carbohydrates | 34.02% |
| Proteins | 7.20% |
| Free sugar | 3.00% |
| Free amino acids | 7.00% |
| Microorganisms (billions/gm) | 3.00 B |

The biodegrading enzymes include amylase, phenoloxydase, and/or lactase, present along with the microorganisms in the second stage that enable the process of the invention to accomplish what it does with such efficiency and safety. The decomposing processes they initiate not only free whatever nutrients remain in dead organic matter, but they also stimulate the continuing reuse of those local fertilizers that protect arable land from sterilization. And it is particularly worth noting that after the processings according to the invention that there will be no undesirable residues, and the screened tailings can be safely added to any landfill.

For these biochemical processes to occur with this enzyme, the addition of organic matter (humus) is imperative. These processes cannot perform their function without the stimulus of the dormant energy drawn from organic matter. Even then, the microbiological activity that follows is influenced by hydric additions, aeration, heat transfer, and the acidity-alkaline balances of the soil pH factor. And it is because of the electro-negative behavior of humus and the clayish humic complex that the fertilization ions with electro-positive charges are retained by means of shared or covalent bonds.

Because organo-biological additions to the soil have not been regularly made during the past 25 years, it is now ecologically advantageous to provide for the regular addition of compost/humus to conventional fertilizers. This is because until now, only nitrogen, phosphorous and potassium were added to soil, since the prevailing wisdom was that the soil had only a chemical base and was without a biological one.

The inescapable demands of the ecosystems require the availability of a technique that can return to the soil all the ingredient that have been taken from the soil during years of neglect. Thus, the recovery of the impaired ecosystem can be expressed with the following equation as a preferred embodiment:

$$MSW + \text{Sewage Sludge} + \text{enzyme} = EPA \text{ Type 1 Compost.}$$

Advantages of the present invention are as follows. Raw materials are untreated MSW and sewage sludge. In-vessel composting eliminates rodents, flies and odors. Raw materials require no pre-shredding, sorting or bulking. It reduces MSW by 75%, and sewage sludge entirely. Energy requirements are extremely low. The capacities are approximately 250 tons per day per vessel. The present invention bioconverts both MSW and sludge in one operation, and it destroys all pathogens in raw materials. Further advantages include the use of the invention to produce a compost which can be utilized in farming to increase crop production, yield crops of better quality with longer shelf life, grow plants more absorptive of chemical fertilizers, end soil stagnation, grow plants more resistant to drought, make the soil more moisture-retentive, and reduce chemical fertilizer run-off. The claimed system provides services to towns and municipalities that allow the disposal of their municipal solid waste stream, and of their sewage sludge, by maximizing composting principles never before utilized in a high-technology vertically-integrated system. The process of the invention can stand the most stringent environmental and ecological scrutiny, since it emits no odors, effluents or annoying by-products. Even at full power, its operating sounds are well within OSHA standards. Its plants require only a "MSW transfer station permit" outside of the local building permitting process.

BRIEF DESCRIPTION OF THE DRAWINGS

Other objects and features of the present invention will become apparent from the following detailed description considered in connection with the accompanying drawings which disclose embodiments of the present invention. It should be understood, however, that the drawings are designed for the purpose of illustration only and not as a definition of the limits of the invention.

In the drawings, wherein similar reference characters denote similar elements throughout the several views:

FIG. 4 shows a section view of the digester along line 4—4 of FIG. 2;

FIG. 5 shows an end view of a variable pitch baffle;

DETAILED DESCRIPTION OF PREFERRED EMBODIMENTS

Figure 1:
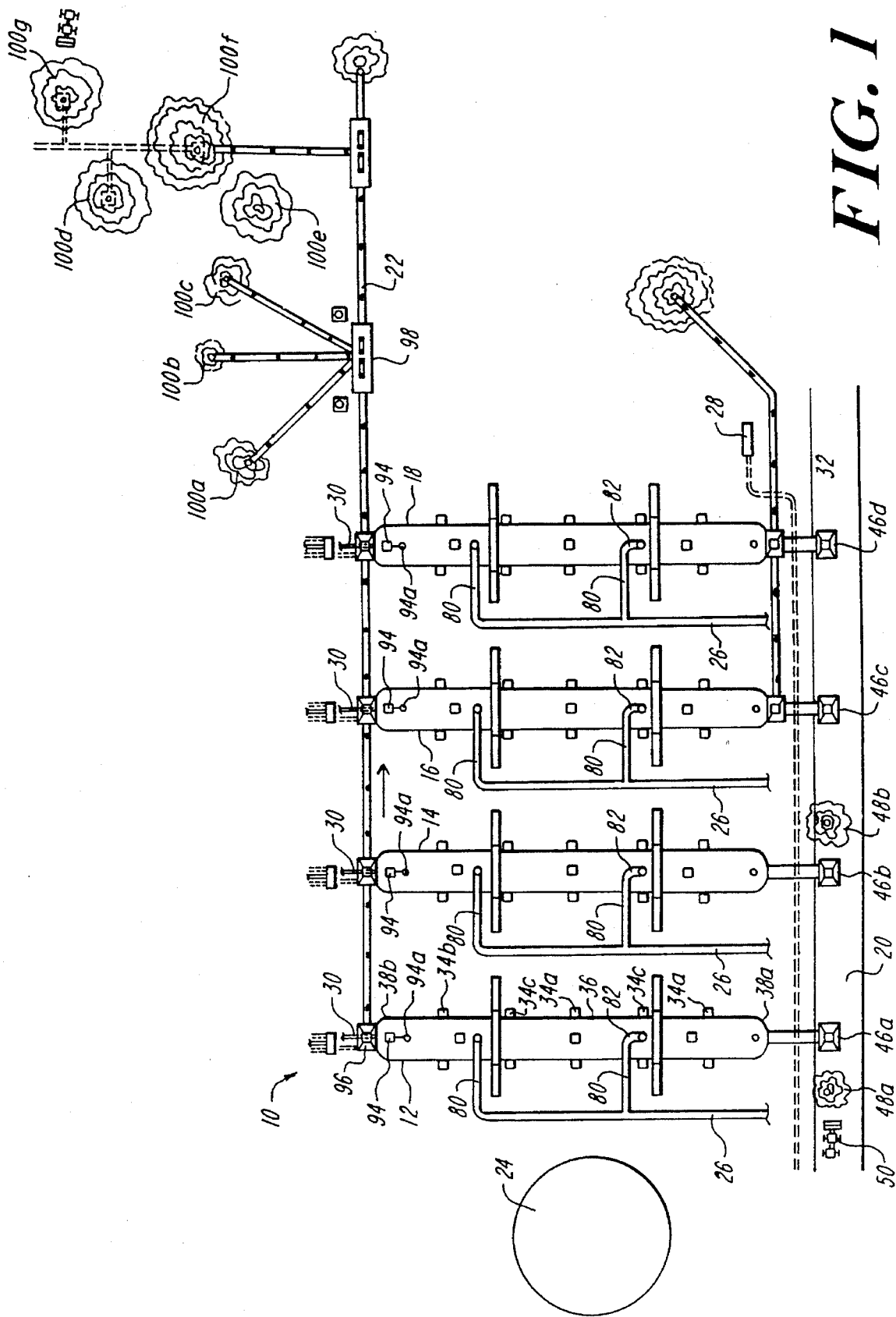
FIG. 1 shows a plan view of the apparatus for carrying out the process of the invention.

Turning now in detail to the drawings, FIG. 1 shows the bioconversion system 10 utilizing four modular steel structure digesters 12, 14, 16 and 18 fabricated so as to conform to the standards of both the American Institute of Steel Construction and the American Steel Institute. Because it is a multi-vessel system, the number of vessels can be increased for expansion of the processing plant to handle increased amounts of MSW. As the population it serves increases, the plant's capacity can be readily increased so as to avoid premature obsolescence of the system.

Figure 2:
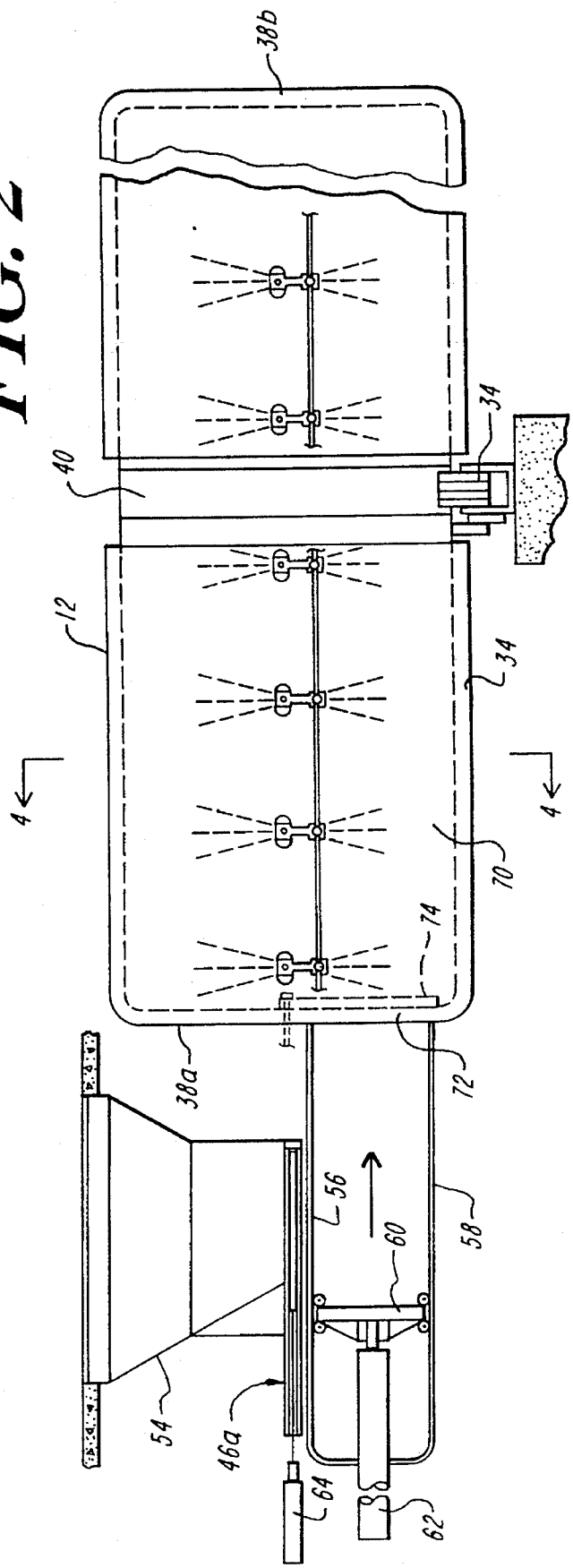
FIG. 2 shows a ram operated hopper for feeding MSW into an adjacent digester.

On entering the plant, each loaded refuse truck has its gross weight recorded before dumping its waste 20 beside an available receiving hopper 22, 24, 26 or 28, respectively, on the tipping floor. After dumping, each truck leaves with its net vehicle weight recorded, and the weight of the waste it arrived with is determined electronically. All three weights are noted on the driver's transaction ticket issued at the control station. The plant's tipping floor operators will spread the refuse for inspection and remove such unassimilables as appliances, car tires, batteries, large metal objects, etc. They will be consigned to special containers under the tipping floor for further disposal. As shown in FIG. 2, payloaders 30 will push all other refuse 20 into a receiving hopper 22 for processing in the next available vessel-digester. The entire operation is computer controlled.

Once they are loaded, hoppers 22, 24, 26 or 28 will be emptied by gravity through sliding bottom 23 into the cylinders 12, 14, 16 or 18, respectively. A 2,000 psi hydraulic ram 32 will displace the piston 34 seven feet forward within cylinder 36 to load the vessel 12 through door 38 with approximately 70 cubic feet of refuse per piston stroke and at a rate of four strokes/minute.

Figure 2A:
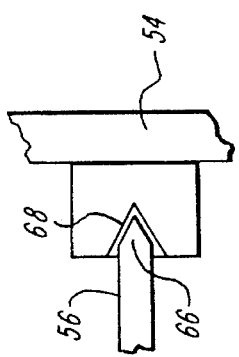
FIG. 2A shows an enlarged view of the leading edge of the sliding bottom of the MSW hopper.

FIG. 2A shows how sliding bottom 23 has arrow head shaped end 25 that locks into V-shaped wall segment 27 of hopper 22.

Once the vessel is loaded with 230–270 metric tons of MSW, untreated sewage sludge from holding tank 40 of FIG. 1 is pumped into each vessel through line 42 and an overhead six-inch manifold through hoses 44 for vessel 12, hoses 46 for vessel 14, hoses 48 for vessel 16 and hoses 50 for vessel 18. There is a quick connect fitting serviced from an inspection bridge. A catwalk running the full length of the vessel can also be installed. The in-ground sewage holding tank 40 will hold at least one week's processing requirements.

Figure 3:
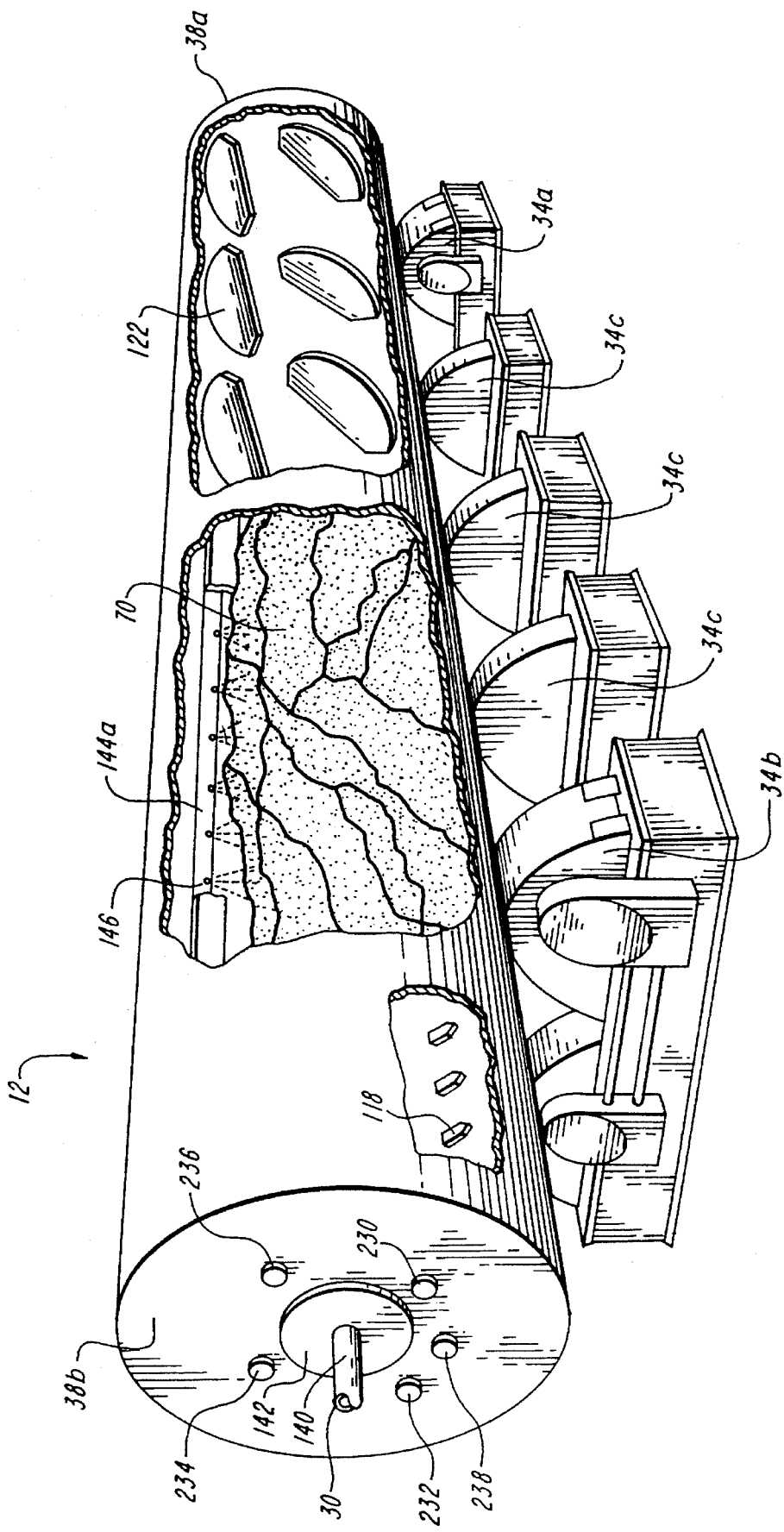
FIG. 3 shows a partial cut away perspective view of an MSW digester according to the invention.

Referring now to vessel 12 only, for the sake of brevity, although the same applies to the other vessels, FIG. 3 shows at this stage of the process, vessel 12 filled with a desirable weight ratio of carbon to nitrogen of 30:1. The amount of nitrogen-rich sewage sludge added is in accordance with the organic carbon content of the MSW being processed. Ideal carbon-to-nitrogen weight ratio range is 25–32:1. Then the vessels are rotated by power drive rollers 52 and 54 at each end of the vessel and by idler rollers 56, 58 and 60 in the middle of the vessel at the rate of 20 to 30 rph (revolutions per hour).

FIG. 4 shows a cross section of a double-walled vessel 12 having an outer aluminum wall 62 and an inner carbon steel wall 64. Walls 62 and 64 are held a spaced distance apart by 2-inch by 6-inch by 0.25-inch channel irons 66, and between these walls and the channel irons is a layer of thermal insulation 68. Vessel 12 has an inner diameter of 14 feet 3/8 inches, inner wall 64 is 5/8 inches thick, and outer wall 62 is 1/32 inches thick, such that the outer diameter is 16 feet for each vessel.

Inside the vessel, as shown in FIG. 4, the refuse will be completely broken up by the tumbling action caused by 1/2-inch×12-inch steel stringers 70 set at a 15° angle with respect to the vessel diameter and running the full length of the rotating vessel. The refuse will also be broken up by sharp steel spikes 72 running diagonally that tear at the refuse 20. These spikes are 1/2 inch by 2 inches by 7 inches, and are located every two feet around the entire circumference inner wall of the vessel with spike rings every two feet longitudinally welded to the inner wall of the vessel.

Innoculent starter live culture of multifloral bacteria and microbes are present in both solid waste and sewage sludge, and are injected initially to begin the process of biodegration.

These tearings and tumblings create more shredded surface and cause billions of bacteria in a multi-microbial flora, actinomycetes, protozoa and fungi to start the biodegradation of all organic matter present in the refuse and sludge. The rotation of the vessel will continue for 24 to 36 hours in an ideal climate for thermophilic bacteria in a first zone of the first stage to reproduce themselves. After it is preconditioned in a mixing plenum located outside of the vessel, filtered fresh air is constantly fed in either countercurrently or concurrently with the refuse flow during this period, and this air is heated and injected with carbon dioxide and water vapor with preset moisture-to-air ratios.

Figure 7:
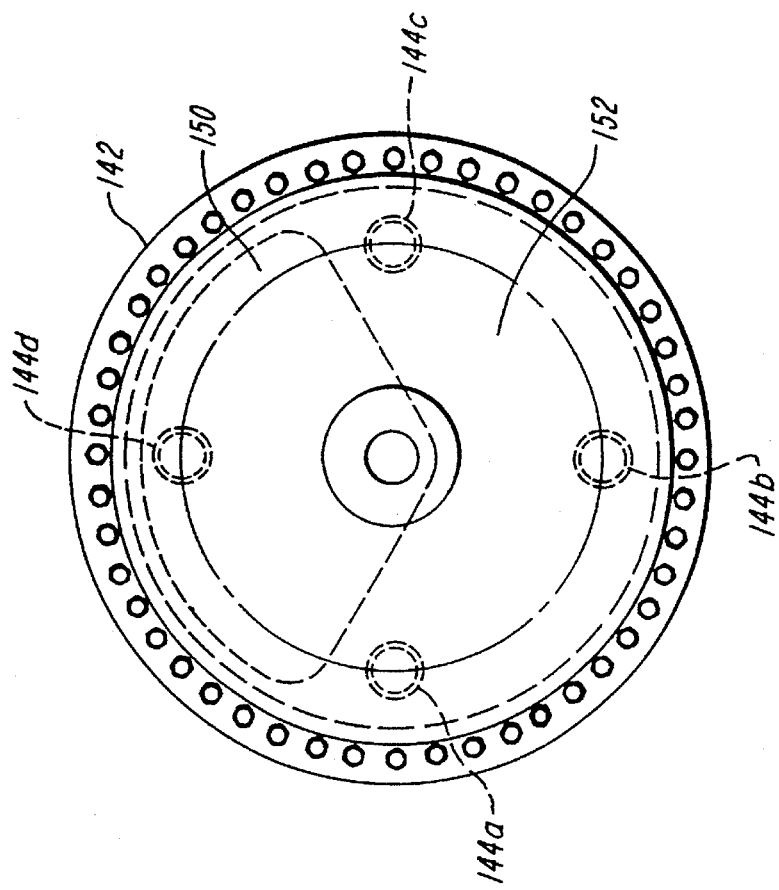
FIG. 7 shows a section view of the nozzle injector along line 7—7 of FIG. 6.
Figure 6:
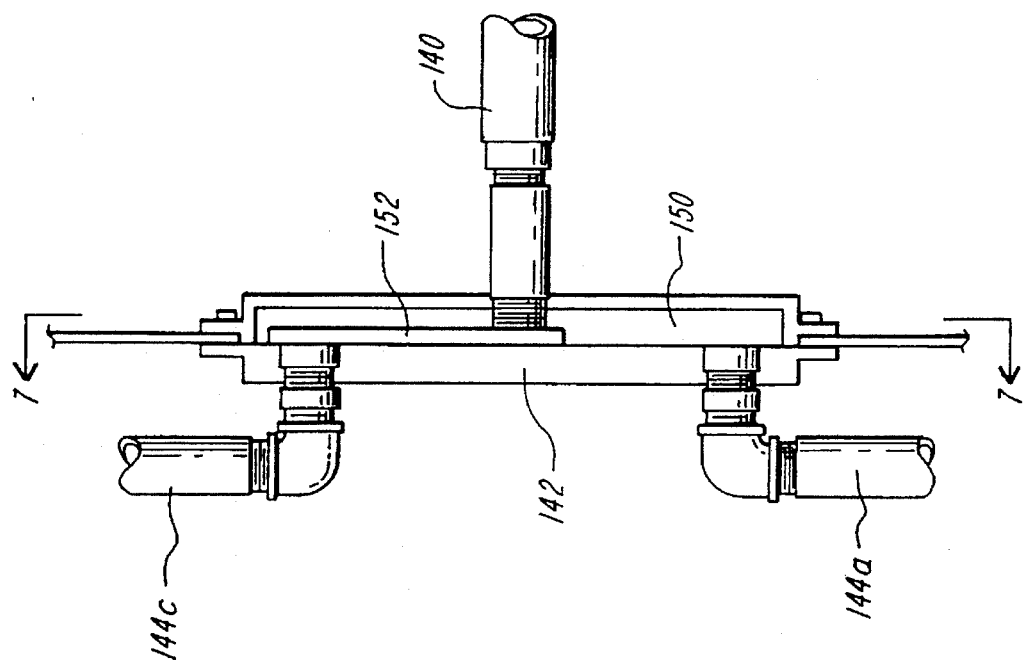
FIG. 6 shows a side view of the nozzle injector for fluids to be injected into the digester apparatus.

These air $CO_2$, $H_2O$ mixtures enter vessel 12 through nozzle injector 74 as shown in FIGS. 3, 6 and 7, and flow through distributor 76 into aeration pipes 78, 80, 82 and 84. Bolts 86 attach distributor 76 to front end wall 88 of vessel 12. The vessel has back end wall 89. FIG. 4 shows how the aeration pipes extend from the centrally located distributor 76 outwardly to the inner wall 64 and then extend the full length of the vessel while in simultaneous contact with adjacent stringer 70. Distributor 76 has interior ribs 77 to support the circular walls 79 of the distributor. The distributor is so constructed that the air from plenum 202 never penetrates into or below the surface of the MSW and bacteria. Thus, there is no turbulence that will disturb the bacteria. The vessel is filled to about 85% by volume with the MSW and bacteria. The distributor ensures that the air always flows into the 15% by volume void space above the MSW and bacteria.

In contrast to the prior art digester drums, the entire vessel 12 of the invention functions as a first zone 140 in FIG. 2 on the first day during digestion by the thermophilic bacteria. The entire vessel 12 functions as a second zone 160 on the second day during digestion by the mesophilic bacteria. The entire vessel functions as a third zone 180 on the third day during digestion by the other aerobic microorganism combination of actinomycetes, protozoa and fungi.

As shown in FIG. 4, the vessel rotates clockwise, as indicated by arrow A, during the Stage 1 processing through the three climate zones.

During the approximately first 24 hours, entire vessel 12 functions as the first aerobic climate zone 140 of Stage 1, and the thermophilic bacteria reproduce, by binary fission, billions of times over. Digestion of the MSW and sludge by the bacteria causes the temperature to rise to about 175° F. to 178° F. Then the temperature is slowly decreased from 175° F. to 120° F., and the bacteria stop reproducing due to controlled air flow at a lower temperature at 98.6° F. FIG. 3 shows how the air mixture 90 exits pipe 78 through discharge opening 92 into vessel 12. The computer processing unit 200 controls the process variables within the thermophilic zone of Stage 1 such that the temperature ranges from 175° F. to 178° F., the moisture content of the air is 33% by volume, the carbon dioxide content of the air is 25% by volume, and the biodigestion time is 24 hours.

During the second 24-hour interval, the entire vessel 12 becomes a second zone. The MSW and sewage sludge processed in the first zone during the first 24 hours are now automatically into a second aerobic climate zone 160 of Stage 1. In the second zone, mesophilic bacteria in the entire vessel thrive and reproduce at a temperature range of 145° F. to 162° F. and with different proportions of warm air, carbon dioxide and moisture. Digestion of the MSW and sludge by mesophilic bacteria causes the temperature to rise to about 145° F. to 162° F. After 24 hours, its temperature will drop due to controlled lower air temperature of 98.6° and the mesophilic multi-bacterial flora will stop reproducing. The computer processing unit 200 controls the process variables such that the temperature ranges from 145° F. to 162° F., the moisture content of the air is 30% by volume, the carbon dioxide content of the air is 23% by volume, and the biodigestion time is 24 hours.

During the third 24-hour interval, the entire vessel 12 becomes a third zone. The MSW and sewage sludge processed in the second zone during the second 24 hours are now automatically into a third and final climate zone 180 of Stage 1. In the third zone, a different microorganism combination of actinomycetes, protozoa and fungi grows, reproduces, and digests the MSW and sludge, producing a slightly lower temperature range of 120° F. to 144° F. for an additional 24 hours. The bioconversion process of Stage 1 is then completed and the temperature drops to approximately 110° F. The computer processing unit 200 controls the process variables within the third zone of Stage 1, such that the temperature ranges from 120° F. to 144° F., the moisture content of the air is 27% by volume, the carbon dioxide content of the air is 19% by volume, and the biodigestion time is 24 hours.

The computer program will stop the vessel's rotation, activate the hydraulic discharge gate-valves 94 at its output end 89, as shown in FIG. 1, and move the variable pitch baffles 96 in the rotating vessel from the neutral position shown in FIG. 4 to a 30° forward pitch, as shown in FIG. 3. The computer will then restart the vessel's rotation and the finished compost will begin to discharge into the hoppers 98, and then from these hoppers onto the conveyor belt 100. The conveyor belt will commence a forward motion, to the right, as shown in FIG. 1, toward the primary rotary trommel screening device 102.

FIGS. 2, 4 and 5 show how variable pitch baffle 96 located within the vessel 12 is controlled by control rod 104 located on the outside of vessel 12. Manipulation of the variable pitch baffle occurs by means of the bell crank assembly 106 through flange 108 to rotate baffle 96 in a counter Clockwise direction as shown by arrow C. Reinforcing ribs 110 strengthen the baffle. The baffle includes two rotatable arms 97 and 99 joined at the center to a rotatable shaft 101.

The variable pitch baffle functions like a non-continuous auger to increase or decrease the forward motion in the first stage, and reverse motion in the second stage of the material being processed. The baffle is adjacent to the inner surface of the inner wall 64 of the vessel but is a spaced distance therefrom. This permits the variable pitch and adjustment to produce the auger effect. The stringer 70 scoops up the processed material and deposits it on top of the baffle surface to give the material a forward auger-like movement in the first stage and in the second stage produces a reverse auger-like motion.

The system is flexible enough to accommodate both manual and fully automated sorting and separation. Preferably, the plant will be fully automated by incorporating a ferrous metal separator unit 112 and another non-recyclables separator unit 114 next to the rotary trommel screening device 102.

The screening tailings 116 of the primary trommel unit 102 can be safely carted away to a landfill, since it has been exposed to reasonably high temperatures for a number of days. For all practical purposes, it can be said that they were "autoclaved" in Stage 1 the process. The same applies to rejected material in the sorting and separation process, most of which is ready for recycling, and is free from contaminants and pathogenic bacteria. The output conveyor 118 of the primary trommel will move the screened material to the secondary screening trommel 120, where conveyor 122 transports the finished product of Stage 1.

The screening tailings 126 of Stage 1 of the process can be reintroduced into vessels 16 and 18 through back end 89 for reprocessing as Stage 2. In one embodiment of Stage 2, the vessels continue to rotate in the same direction, but the variable pitch baffles 96 are rotated so that they push the tailings 126 in the opposite direction, namely, from the back end 89 to the front end 88 of the vessel. In another embodiment of Stage 2, the computer causes vessels 16 and 18 to rotate in the opposite direction and the baffles are adjusted in pitch to push the tailings 126 from back end 89 to front end 88. Stage 2 includes inoculating the tailing 126 with biodegrading enzymes described in Italian Patent No. 999, 818 or in Spanish Patent No. 435,460, such as amylase, phenoloxydase, and/or lactase, and inoculating with the microorganism *Bacillus Subtilis*.

The end product 124 of Stage 1 is a fine compost or humus or soil additive with specifications that meet and exceed EPA compost Type 1 standards for agricultural use. The end product 124 results from having the bacteria in Stage 1 convert the organic carbon in the MSW, and the nitrogen in the sludge into protein. The product quality control can be closely monitored by a biotechnology professional in a plant site lab equipped to handle necessary testing. The Stage 1 process described above can be effected in the rotating vessels 12, 14, 16 or 18. Nevertheless, if only vessels 12 or 14 are used in Stage 1, then vessels 16 and 18 can be specially equipped to carry out the Stage 2 process to reprocess the finished product 126 of Stage 1 into a high-quality organic biological fertilizer 132 utilizing the enzymes discussed above. The Stage 2 process takes an additional 24 hours in biodigestion. The computer processing unit 200 controls the process variables within Stage 2 such that the temperature ranges from 175° F. to 178° F., the moisture content of the air is 33% by volume, the carbon dioxide content of the air is 25% by volume, and the biodigestion time is 24 hours.

The end product 132 of Stage 2 is collected in hoppers 128 and transported by conveyor 130. This organically based fertilizer, in which NPK has been chemically bonded to the organic matter, is the perfect transition from decades of chemical fertilizer abuses in agriculture to humus-based fertilizers. The rational use of organic soil conditioners or soil additives instead of chemical fertilizers will end the undesirable chemical run-offs that contaminate drinking water, streams and rivers across the land with disastrous environmental impact.

Figure 8:
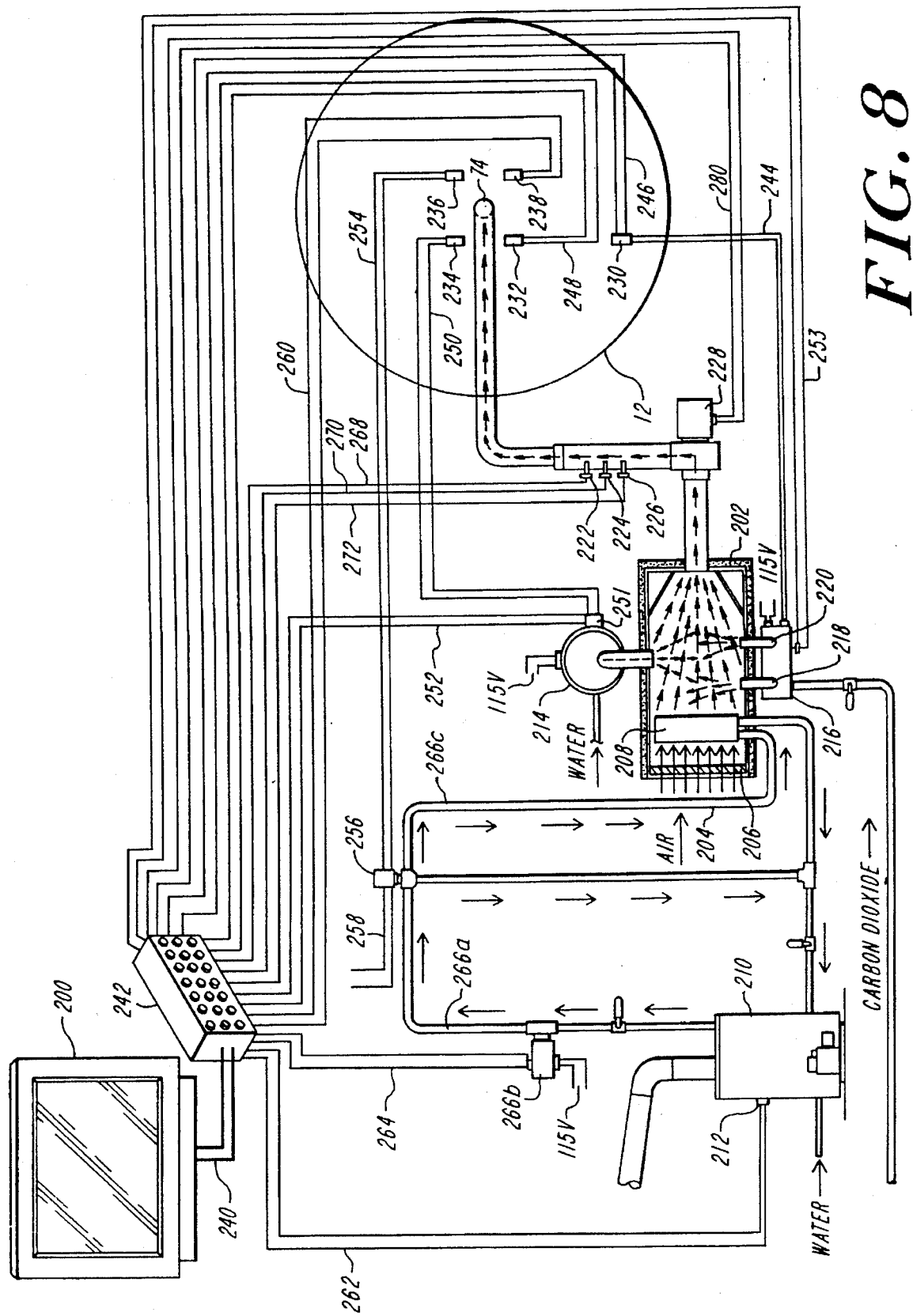
FIG. 8 shows a plan view of the control system for the invention.

As shown in FIG. 8, a computer processing unit 200 (CPU) controls the entire operation of this plant. The construction of this CPU is conventional and could be similar to those structures as shown in the Larson U.S. Pat. No. 3,178,267 or shown in the Yeagley U.S. Pat. No. 4,499,614. The disclosure of these patents is herewith incorporated by reference. Its operation begins with the recording of the gross vehicle weight of incoming refuse trucks and the reading of their bar code identification just before entering the plant. It continues with the mixing operations that occur in the mixing plenum 202. Plenum 202 is located outside of the vessels. Within plenum 202, the components are closely monitored, constantly analyzed and exactly adjusted to generate the optimal biological conditions required by the multi-flora microbial population inside the rotating vessel-digester 12, 14, 16 and 18. The air 204 entering each plenum 202 is purified by its electrostatic filtering unit 206. The temperature required in the coil of its hot water heat exchanger 208 is crucial to maintaining the requisite climate inside the plenum at all times. This hot water temperature is determined by boiler 210 and boiler controller 212. This is vital to the air humidification using the atomizing humidifier 214. This is followed by the introduction of carbon dioxide into plenum 202 through mixing manifold 216 through injection nozzles 218 and 220 prior to entering the rotating vessel 12. Temperature sensing element 222, moisture sensing element 224, and carbon dioxide sensing element 226 placed on the output side of the plenum monitor the air mixture as it is pumped by blower 228 toward the vessel 12. The flow rate of air 204 into the plenum is determined by the speed of blower 228 as controlled by the CPU.

Each vessel 12 has five monitoring sensors at both ends to allow the CPU to make necessary adjustments at the point of utilization. The five monitoring sensors are the carbon dioxide sensor 230, the oxygen sensor 232, the moisture sensor 234, the temperature sensor 236, and the methane sensor 238. The CPU 200 is connected by coaxial fiber optic cable 240 to the analog-digital encoder 242. The carbon dioxide sensor 230 is connected by leads 244 to the manifold 216 and simultaneously is connected by leads 246 to encoder 242. The manifold 216 is connected by leads 253 to encoder 242. The oxygen sensor 232 is connected by leads 248 to the encoder 242. The moisture sensor 234 is connected by leads 250 to the humidifier controller 251 which is also connected by leads 252 to the encoder 242. The temperature sensor 236 is connected by leads 254 to the diverting zone valve 256 which is connected by leads 258 to the encoder 242. Methane sensor 238 is connected by leads 260 to the encoder. Encoder 242 is connected by leads 262 to boiler controller 212, and the encoder is also connected by leads 264 to circulator pump 266. Encoder 242 is connected by lead 268 to sensor 222, by lead 270 to sensor 224, by lead 272 to sensor 226.

The CPU controls the conditions within the mixing plenum 202 such that the preconditioned air has a temperature of about 98.6° F., such that the moisture content of the air mixture is 33% by volume, the carbon dioxide content of the air mixture is 25% by volume, and the balance, or 42% by volume, is air. Conduit 74 delivers from 320 to 350 ft.$^3$/min. of this preconditioned air mixture into vessel 12.

Therefore, if temperature sensor 236 signals that the temperature in vessel 12 is above or below the required or reference temperature for vessel 12, then CPU 200 will actuate encoder 242 to send a signal to boiler controller 212, and to circulator 266 and to valve 256 to adjust the water temperature and flow rate into heat exchanger 208 in order to affect the appropriate temperature correction by adjusting the water flow rate.

Thus, if moisture sensor 234 signals that the humidity in vessel 12 is above or below the required or reference moisture content for vessel 12, then CPU 200 will actuate encoder 242 to send a signal to humidifier controller 251 in order to affect the appropriate humidity correction by adjusting the moisture flow rate through humidifier 214.

Thus, if the methane sensor 238 detects the presence of methane within vessel 12, this indicates a lack of adequate air flow into the vessel. This will cause the CPU through encoder 242 to cause blower 228 to increase the flow rate of air to enter vessel 12 through conduit 74 by sending a signal over lines 280. This will eliminate the anaerobic conditions that cause methane in the vessel.

These various adjustments will change the composition of the air mixture in the mixing plenum 202 that flows through conduit 74 into the vessel 12. The entire vessel 12 is changed from being the first zone into being the second zone by modifying the air mixture in the plenum (i.e., lowering the temperature from 175° F. to 145° F.) and then is changed from being the second zone into being the third zone by modifying the air mixture in the plenum (i.e., lowering the temperature from 145° F. to 120° F.). The modified air is then circulated through the vessel 12.

It is the internal interaction of these three variables (air temperature as read by sensor 222, moisture as read by sensor 224, and carbon dioxide as read by sensor 226) that necessitates their control by a computer. From the loading process to the opening of the gate valves that discharge the finished product, every process step of the vessel-digester is controlled by CPU commands. Temperature graphs will be recorded by the CPU for the entire period of thermophilic and mesophilic biodegradation that takes approximately 72 hours for Stage 1. EPA inspectors will accept these graphs as definite proof that temperatures required to destroy the pathogenic bacteria have been reached when and as needed to comply with their mandated federal standards. Stage 2 process steps are also controlled by the CPU.

While several embodiments of the present invention have been shown and described, it is to be understood that many changes and modifications may be made thereunto without departing from the spirit and scope of the invention as defined in the appended claims.

What is claimed is:

1. An apparatus for processing solid organic waste material and sludge comprising:

a. a vessel having a cylindrical wall having an axis and two opposing end walls, which cylindrical wall and end walls define a chamber, said vessel having opening means, mixing means, gas input means, water input means, temperature control means, and gas output means, said opening means for receiving solid organ waste material and sludge, and discharging one or more biodegradation products; said mixing means for forming an admixture of solid organic waste material and sludge, for forming admixture of one biodegradation products and microorganisms, for bringing said admixture in contact with gases and water and to provide temperature uniformity throughout said vessel, said mixing means cooperating with the rotation of said vessel to distribute solids throughout said vessel upon receiving solids within said chamber from opening means and to propel said solids to said opening means to discharge said solids from said vessel; said gas input means, water input means, and temperature control means for imposing one or more growth conditions within said vessels, said gas output means for discharging gases from said vessel;

vessel rotating means for rotating said vessel about said axis in cooperation with said mixing means to direct movement of said solids within said vessel;

said vessel for receiving solid organic waste material and sludge within said chamber, said mixing means forming a first of said solid organic waste material and sludge, admixture and said vessel imposing first growth conditions, said first growth conditions comprising a temperature of 160° to 185° F., gaseous water in a concentration of 25 to 40%, and sufficient oxygen to promote growth of thermophilic microorganisms, said thermophilic microorganism biodegrading said admixture to form a thermophilic biodegradation product, and said vessel for receiving a mesophilic microorganism through said opening means, said mixing means forming a second admixture comprising said thermophilic biodegradation product and said mesophilic microorganism, said vessel for imposing second growth conditions on said second admixture to promote growth of said mesophilic microorganisms, said second growth conditions comprising a temperature of 145° to 162° F., gaseous water of 25 to 45%, and sufficient oxygen to support growth of mesophilic microorganisms to form a mesophilic biodegradation product comprising an organic material which is from said chamber.

2. The apparatus of claim 1 wherein said vessel receives a third microorganism comprising actinomycetes, said mixing means forming a third admixture comprising said third microorganism and said mesophilic biogradation product, said vessel imposing third growth conditions on said third admixture said third growth conditions comprising a temperature of 120° to 144° F., a gaseous water concentration of 25 to 45%, and sufficient oxygen to support the growth of one or more actinomycetes for forming a third biodegradation product comprising an organic material.

3. The apparatus of claim 1 wherein said vessel comprises sensors for one or more of the following compositions comprising carbon dioxide, water and oxygen, and one or more sensors for temperature.

4. The apparatus of claim 3 wherein said one or more sensors are in communication with computer control means for regulating gas input means, water input means and temperature control means.

5. The apparatus of claim 1 wherein said mixing means comprises one or more baffles projecting inwardly into said chamber from said cylindrical wall, said baffles having a planar surface for imparting movement and direction to solids and liquids, said one or more baffles capable of assuming at least two of four positions, one of said positions comprising said planar surface inclined for directing solids and liquids in a first direction upon rotation of said vessel in a first rotational direction, one of said positions comprising said planar surface inclined for directing solids and liquids in a second direction opposite said first direction upon rotation of said vessel in said first rotational direction; one of said positions comprising said planar surface perpendicular to the axis of rotation to mix solids and liquids without imparting movement of solids and liquids to one of said ends for mixing said solids and liquids, and one of said positions comprising said planar surface is in a plane defined by the arc of rotation of said vessel, which allows rotation of said vessel without substantial mixing.

6. The apparatus of claim 1 wherein said vessel rotating means comprises rollers.

7. The apparatus of claim 1 wherein said vessel comprises tracks for receiving said rollers for maintaining the position of said vessel on said rollers.

* * * * *